Dec. 20, 1927.

W. R. PAXSON 1,653,583

CHILD'S VEHICLE

Filed Jan. 19, 1925

Walter R. Paxson.
INVENTOR

Patented Dec. 20, 1927.

1,653,583

UNITED STATES PATENT OFFICE.

WALTER R. PAXSON, OF GLENSIDE, PENNSYLVANIA.

CHILD'S VEHICLE.

Application filed January 19, 1925. Serial No. 3,447.

This invention relates to children's vehicles, and an object of the invention is to provide a combined velocipede and scooter, which the child may use either as a velocipede or as a scooter, as he desires, without requiring alteration to the structure of the device, and one which when used as a velocipede may also be used for carrying various types of articles on the scooter platform.

More specifically, the invention comprehends the provision of a child's vehicle as specified, in which a relatively large front wheel is supported by a suitable fork, and is adapted to be propelled through the medium of suitable pedals and in which a pair of rear supporting wheels are mounted at the rear end of the frame. This frame extends rearwardly and downwardly from the fork, and has a rear horizontal portion forked to provide a support for the scooter platform and terminating in upturned rear ends to provide a support for the axles upon which the rear wheels are mounted.

Figure 1:
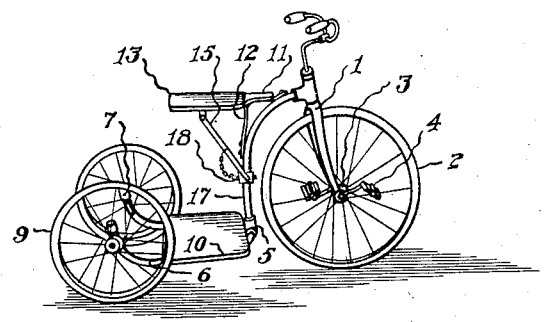

Other objects of the invention will appear in the following detail description,—and in the accompanying drawings wherein:

Figure 1—is a perspective view of the improved child's vehicle.

Figure 2:
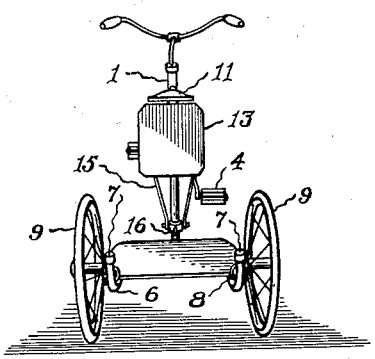

Figure 2—is a rear elevation of the vehicle with a hinged seat in its vertical position.

Figure 3:
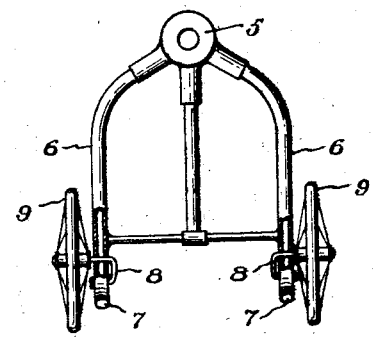

Figure 3—is a plan view, partly in section showing the horizontal portion of the frame of the vehicle and the manner of mounting the rear wheels in the upturned ends thereof.

Figure 4:
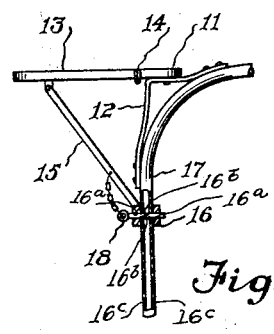

Figure 4—is a side elevational fragmentary view of a portion of the frame and the attachment of the seat thereto and the provision for holding the seat in horizontal position when the device is to be used as a velocipede.

Figure 5:
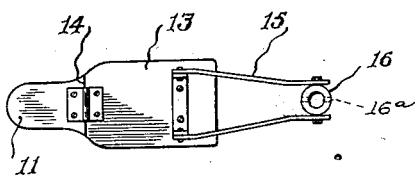

Figure 5—is a bottom plan of the seat structure.

Referring more particularly to the drawings, the improved vehicle comprises a fork 1 rotatably mounted in the front end of the frame structure which fork may be of any approved type, such as used in velocipedes or similar vehicles, and in said fork is rotatably mounted the front relatively large propelling and steering wheel, 2. The axle 3 upon which the wheel 2 is mounted in the fork 1, has pedals 4 mounted thereon to permit the propelling of the vehicle through pedalling.

The frame 5 which may be constructed of tubular metal or any other suitable material as desired, preferably extends from the sleeve in which the upper end of the fork 1 is mounted, in a curve extending rearwardly and downwardly clear of the rear upper quadrant of the wheel 2, and then extends straight downwardly almost tangentially to the rearmost point in the periphery of the wheel to a point three or four inches above the level of the ground thus leaving sufficient space for the horizontal portion 6 of the frame 5, to clear the ground or surface over which the vehicle is travelling. At the lower end of the vertical portion 17 the frame 5 is forked and provides the two substantially horizontal parallel arms 6—6 which have their rear ends 7 curved upwardly. Axles 8 are rigidly mounted in the said upwardly curved ends 7 and on them are rotatably mounted the rear supporting wheels 9. A platform 10 is supported fixedly on the horizontal arms 6.

A seat structure is provided which includes the rigid portion 11 supported from the frame by a suitable angle bar 12, and it also includes the hinged portion 13 forming the seat proper which is hingedly connected as shown at 14, to the rigid portion 11. A suitable brace 15 is pivotally connected to the hinged portion 13 or seat proper and to a collar 16 which is slidable on the vertical portion 17 of the frame 5. A pin 18 or other suitable device adapted to pass through the hole 16ᵃ in the collar and the hole 16ᵇ and 16ᶜ in the frame may be provided for locking the collar 16 in raised or lowered position, to permit the supporting of the seat proper 13 in its horizontal position when the device is to be used as a velocipede or in its vertical position, as shown in Figure 2, when the device is to be used as a scooter.

From the foregoing description, it will be apparent that I have provided a combined vehicle which may be used either as a velocipede or as a "scooter", depending upon the desires of the child. When used as a scooter, the child may lower the hinged part of the seat 13 to a vertical position clear of the space vertically over the platform and close to the vertical portion of the frame where it is at most over only the forward edge of the platform and is out of the way. When it is desired to use the device as a velocipede, the seat may be raised to horizontal position and the pin 18 may be slipped through the hole in the collar and frame whereby the seat will be rigidly maintained in horizontal position. When so used the platform may be used for supporting various articles.

It is, of course, to be understood, that the invention may be constructed in various other manners and the parts associated in different relations, and therefore, I do not desire to be limited in any manner, except as set forth in the claims hereunto appended.

What I claim is:

1. A child's vehicle comprising a front driving wheel, a supporting frame including a rearwardly extending horizontal forked portion having the rear ends of the arms of the forked portion upturned, axles carried by said upturned ends, a pair of relatively small supporting wheels on said axles, and a platform supported on said horizontal forked portion, a seat including a rigid portion attached to said frame, a hinged portion forming the seat proper, and means connecting said frame and hinged portion for supporting the seat proper in substantially horizontal position.

2. In a child's velocipede, a frame, a seat hingedly carried by the frame, a platform carried by the frame in a plane below the horizontal plane of the seat, a collar slidable on the frame, means for holding the collar at will in a fixed position on said frame, and means connecting the collar and seat for supporting the seat in a horizontal position when said collar is so fixed to the frame.

3. In a child's combined velocipede and scooter, the combination of a frame, a velocipede seat hingedly secured to said frame, a substantially horizontal platform carried by the frame well below said seat and near the ground, and manually adjustable means cooperating with said frame and seat to rigidly hold said seat in a substantially horizontal position when the device is to be propelled as a velocipede, and to permit said seat to hang substantially vertically at and over the forward edge of said platform and close to said frame when the device is to be propelled as a scooter.

4. In a child's combined velocipede and scooter, the combination of a frame, a velocipede seat hingedly secured to said frame, a substantially horizontal platform carried by the frame well below said seat and near the ground, and manually adjustable means cooperating with said frame and seat to rigidly hold said seat in a substantially horizontal position when the device is to be propelled as a velocipede, and to permit said seat to hang vertically close to said frame and in a position where it does not project into the space vertically over said platform when the device is to be used as a scooter.

5. In a child's combined velocipede and scooter, the combination of a frame and a front wheel fork pivotally mounted in the front end of said frame, a relatively large propelling and steering wheel journaled in said fork, said frame extending from said fork rearwardly and downwardly and then extending downwardly in a vertical position close to the rear of said steering wheel, and from the lower end of said vertical position, then extending rearwardly in two parallel horizontal portions terminating each in an upturned end, relatively small rear wheels mounted on said upturned ends, a platform supported on said horizontal portions of said frame, and a seat hinged to said frame to swing from a vertical position close to said vertical portion of said frame to a substantially horizontal position over said platform, and vice versa, and means connecting said frame and said seat for rigidly maintining at will said seat in a horizontal position.

6. In a child's combined velocipede and scooter, the combination of a frame and a front wheel fork pivotally mounted in the front end of said frame, a relatively large propelling and steering wheel journaled in said frame, said frame extending from said fork rearwardly and downwardly and then extending downwardly in a vertical position close to the rear of said steering wheel, and from the lower end of said vertical position, then extending rearwardly in two parallel horizontal portions terminating each in an upturned end, relatively small rear wheels mounted on said upturned ends, a platform supported on said horizontal portions of said frame, and a seat hinged to said frame to freely swing to and fro between a position substantially vertical and close to said vertical portion of said frame and a position substantially horizontal and in the space over said platform, and manually adjustable means between said seat and said frame to rigidly support said seat in said horizontal position when the device is to be propelled as a velocipede.

7. In a child's combined velocipede and scooter, the combination of a frame and a front wheel fork pivotally mounted in the front end of said frame, a relatively large propelling and steering wheel journaled in said fork, said frame extending from said fork rearwardly and downwardly and then extending downwardly in a vertical position close to the rear of said steering wheel, and from the lower end of said vertical position, then extending rearwardly in two parallel horizontal portions terminating each in an upturned end, relatively small rear wheels mounted on said upturned ends, a platform supported on said horizontal portions of said frame, and a seat hinged to said frame and arranged to lie, when the device is to be used as a scooter, in a substantially vertical position close to the frame and out of the space vertically over said platform, and manually operable means cooperating with said seat and frame to rigidly support said seat in a substantially horizontal position over said platform when the device is to be used as a velocipede.

In testimony whereof I affix my signature.

WALTER R. PAXSON.